Figure 1:
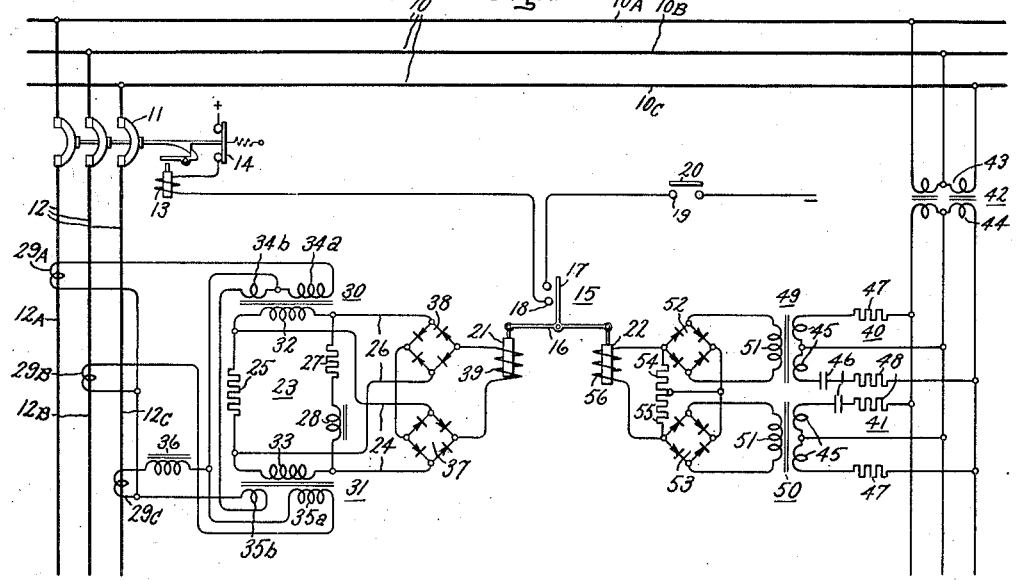

March 30, 1943.  A. R. VAN C. WARRINGTON  2,315,470

PROTECTIVE SYSTEM

Filed March 14, 1941  2 Sheets-Sheet 1

Inventor:
Albert R. van C. Warrington,
by Harry E. Dunham
His Attorney.

Patented Mar. 30, 1943

2,315,470

UNITED STATES PATENT OFFICE 2,315,470

PROTECTIVE SYSTEM

Albert R. van C. Warrington, Wallingford, Pa., assignor to General Electric Company, a corporation of New York Application March 14, 1941, Serial No. 383,308

8 Claims. (Cl. 175—294)

My invention relates to protective systems for electric circuits and more particularly to protective systems employing relays of the distance type.

Distance relays generally include some form of a so-called "ohm unit" which may be of the reactance or impedance type and a power-directional unit for preventing operation of the protective circuit breakers unless the fault is on the portion of the system being protected. It has been found possible to produce a polyphase power-directional relay comprising a single movable element which performs the same function as a separate directional unit for each phase of the system. Such a device is disclosed and claimed in United States Letters Patent 2,110,673, granted March 8, 1938, upon an application of Andrew J. McConnell, and assigned to the same assignee as the present application.

Polyphase ohm units, however, which provide the same distance response for all types of faults occurring on a polyphase system are of very recent origin. In my copending application Serial No. 375,208, filed January 21, 1941, and assigned to the same assignee as the present application, I have disclosed and claimed a polyphase distance relay in which the current and potential connections are changed in response to certain kinds of faults whereby the same distance response for all types of faults may be obtained. Such an arrangement operates very satisfactorily and is less expensive than prior arrangements requiring a plurality of separate relays for phase and ground faults but the switching means required is still relatively costly and, although as simple as possible, it does add a certain amount of complexity. The ideal situation would be to provide a polyphase distance relay which would not require any switching of the current and potential connections and yet which would protect against all types of faults and operate similarly for all of these faults at a predetermined distance from the relay independently of the number of conductors involved in the fault and whether or not ground faults are involved. Such a device is disclosed and claimed in my copending application Serial No. 375,207, filed January 21, 1941, and assigned to the same assignee as the present application.

The present invention is concerned with distance relays in many respects similar to the type disclosed and claimed in my copending application Serial No. 375,207 referred to above. Accordingly, it is an object of my invention to provide a new and improved protective system employing a polyphase distance relay which includes only a single movable element and which will give exactly the same distance response for all faults involving more than one conductor regardless of the number of conductors involved in the fault and whether or not the fault includes ground.

It is another object of my invention to provide a new and improved polyphase ohm unit for a distance relay which may be used with a polyphase power-directional unit which is simple and rugged in construction, requires a minimum amount of panel space, eliminates all risks of false measurement, and has a much lower cost than the devices for performing similar functions heretofore.

Further objects and advantages of my invention will become apparent as the following description proceeds and the features of novelty which characterize my invention will be pointed out with particularity in the claims annexed to and forming a part of this specification.

Figure 2:
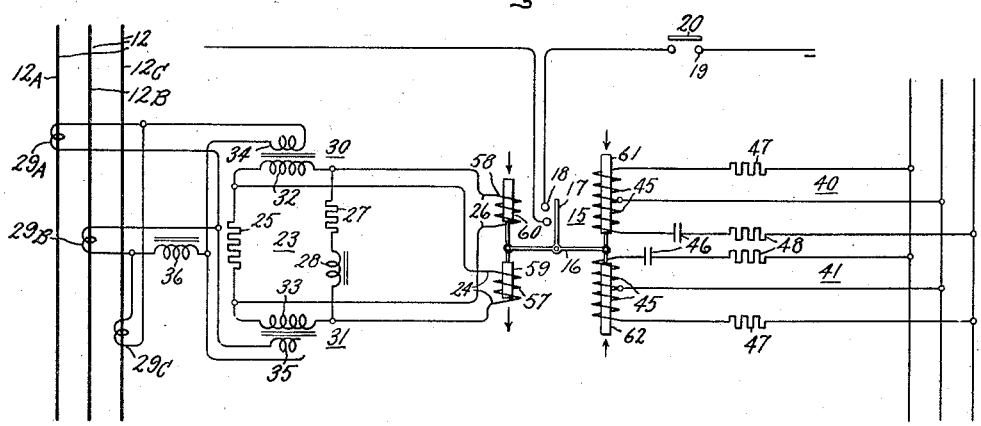
Figure 3:
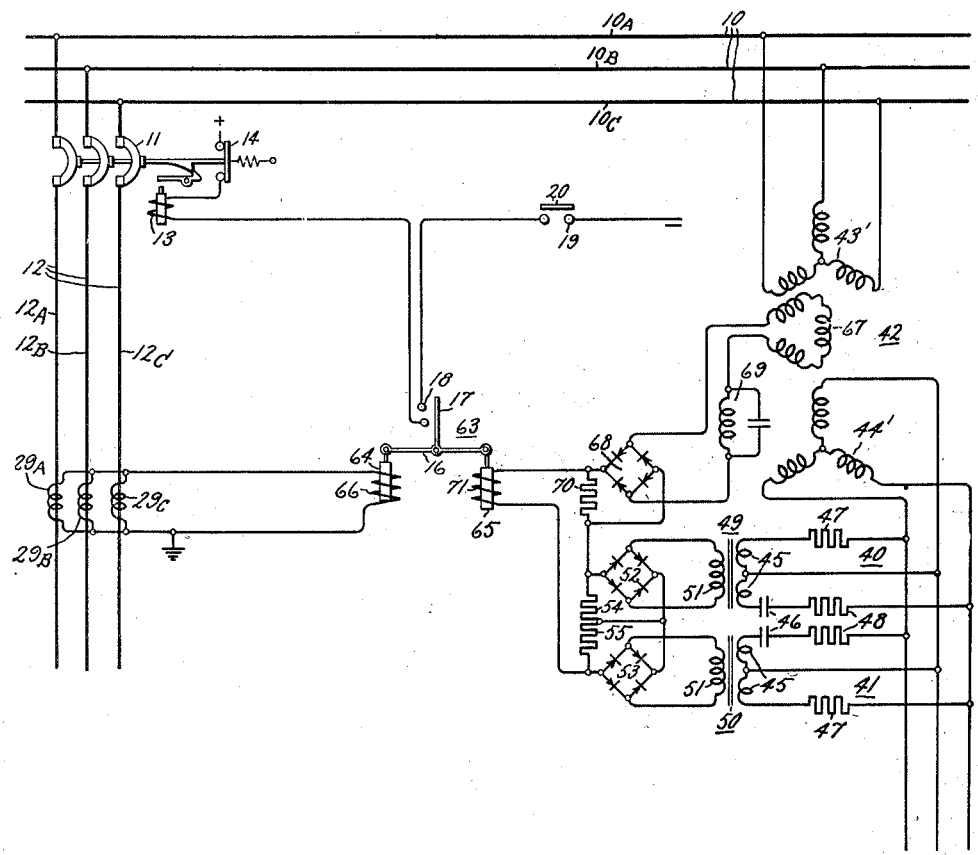

For a better understanding of my invention, reference may be had to the accompanying drawings in which Fig. 1 is a schematic diagram illustrating one embodiment of my invention for protecting against all faults involving more than one conductor, Fig. 2 is a schematic diagram illustrating a modification of the arrangement illustrated in Fig. 1, and Fig. 3 schematically illustrates a protective system employing a distance relay for protecting against faults involving only a single conductor of a polyphase circuit.

Although distance relays are generally classified under two types, namely, the impedance relay and the reactance relay, I have preferred to illustrate my invention specifically as applied to impedance relays although much of the theory included hereinafter applies equally well to both types. The single-phase impedance relay and particularly the ohm unit thereof usually comprises a movable element upon which two opposed torques are applied, one an operating torque proportional to the square of the fault current and the other a restraining torque proportional to the square of the potential of the faulted circuit, which may be mathematically designated as $I^2$ and $E^2$, respectively. In an impedance relay, the ratio $$\frac{E^2}{I^2}=Z^2 \text{ or } \frac{E}{I}=Z$$

which is the impedance of the circuit for the distance to which the relay will reach.

I have discovered that a polyphase ohm unit having a single movable element can be constructed which will have the same distance response for all faults involving more than one conductor regardless of the number of conductors involved in the fault and whether or not a ground fault is involved if the operating torque applied to the movable element is made proportional to $I_1'+I_2'$, where $I_1'$ and $I_2'$ are the magnitudes without regard to sign (rectified values) of the positive and negative-phase-sequence currents respectively flowing in the polyphase circuit at the relay a variable distance from the fault, depending upon the location of the latter, and the restraining torque applied to the single movable element is made proportional to $V_1'-V_2'$, where $V_1'$ and $V_2'$ are the magnitudes, without regard to sign, of the positive and negative-phase-sequence voltages at the relay, respectively. In other words, I have found that $$\frac{V_1'-V_2'}{I_1'+I_2'}=Z_1' \quad (1)$$

for any type of fault involving more than one conductor which might exist on a polyphase circuit, such as a three-phase circuit where $Z_1'$ is the positive-phase-sequence impedance between the distance relay and the fault.

The proof of Equation 1 above for all the different types of faults which might occur on a three-phase alternating-current circuit, such as a transmission line, is included in the table below. In my copending application Serial No. 375,207 referred to above, I have tabulated the positive, negative, and zero-phase-sequence currents and voltages both at the fault and at the location of the distance relay for all types of faults. This tabulation is not included here but the values taken from Table III of that copending application are included in the table below, assuming, for the sake of simplicity, that the positive-phase-sequence impedance of the system is equal to the negative-phase-sequence impedance and the positive-phase-sequence impedance between the relay and the fault is equal to the negative-phase-sequence impedance between the relay and the fault which is, as is well understood by those skilled in the art, a proper assumption in the case of a transmission line.

In the table below, $V_0'$ and $I_0'$ are the zero-phase-sequence voltage and current at the relay with reference to phase voltages and currents, $E$ is the generated voltage or voltage at the fault before the fault occurred, $Z_1$ and $Z_0$ are the positive and zero-phase-sequence impedances of the system viewed from the fault, and $C_1$ and $C_2$ are, respectively, the ratios $$\frac{I_1'}{I_1} \text{ and } \frac{I_0'}{I_0}$$

and $Z_0'$ is the zero-phase-sequence impedance between the relay and the fault.

TABLE

*The symmetrical R. M. S. components of currents and voltages at a distance $Z_1'$ from the fault and the relations between them for various types of faults*

|  | Three-phase fault phases A, B, and C | Line-to-line fault phases B and C | Line-to-ground fault phase A and ground | Double line-to-ground fault phases B, C, and ground |
|---|---|---|---|---|
| $V_1'$ | $\frac{C_1 Z_1' E}{Z_1}$ | $\frac{(Z_1+C_1 Z_1')E}{2Z_1}$ | $\frac{(Z_0+Z_1+C_1 Z_1')E}{2Z_1+Z_0}$ | $\frac{Z_0 Z_1 + C_1 Z_1'(Z_0+Z_1)E}{Z_1(Z_1+2Z_0)}$ |
| $V_2'$ | 0 | $\frac{(Z_1-C_1 Z_1')E}{2Z_1}$ | $-\frac{(Z_1-C_1 Z_1')E}{2Z_1+Z_0}$ | $\frac{Z_0(Z_1-C_1 Z_1')E}{Z_1(Z_1+2Z_0)}$ |
| $V_0'$ | 0 | 0 | $-\frac{(Z_0-C_0 Z_0')E}{2Z_1+Z_0}$ | $\frac{Z_1(Z_0-C_0 Z_0')E}{Z_1(Z_1+2Z_0)}$ |
| $I_1'$ | $\frac{C_1 E}{Z_1}$ | $\frac{C_1 E}{2Z_1}$ | $\frac{C_1 E}{2Z_1+Z_0}$ | $\frac{C_1(Z_0+Z_1)E}{Z_1(Z_1+2Z_0)}$ |
| $I_2'$ | 0 | $-\frac{C_1 E}{2Z_1}$ | $\frac{C_1 E}{2Z_1+Z_0}$ | $-\frac{C_1 Z_0 E}{Z_1(Z_1+2Z_0)}$ |
| $I_0'$ | 0 | 0 | $\frac{C_0 E}{2Z_1+Z_0}$ | $-\frac{C_0 Z_1 E}{Z_1(Z_1+2Z_0)}$ |
| $V_1'-V_2'$ Each rectified | $\frac{C_1 Z_1' E}{Z_1}$ | $\frac{C_1 Z_1' E}{Z_1}$ | $\frac{(2C_1 Z_1'+Z_0)E}{2Z_1+Z_0}$ | $\frac{Z_1'(2Z_0+Z_1)C_1 E}{Z_1(Z_1+2Z_0)}$ |
| $I_1'+I_2'$ Each rectified | $\frac{C_1 E}{Z_1}$ | $\frac{C_1 E}{Z_1}$ | $\frac{2C_1 E}{2Z_1+Z_0}$ | $\frac{(2Z_0+Z_1)C_1 E}{Z_1(Z_1+2Z_0)}$ |
| $\frac{V_1'-V_2'}{I_1'+I_2'}$ Each quantity rectified | $Z_1'$ | $Z_1'$ | $Z_1'+\frac{Z_0}{2C_1}$ | $Z_1'$ |

It will be observed that, if the phase-sequence components of current and voltage from the first column of the table are substituted in Equation 1 above for the different types of faults which might occur on a three-phase system as shown in the last three rows of the table, the same distance response, namely $Z_1'$, is obtained for all faults involving more than one conductor. In the case of a single line-to-ground fault, the relay will not reach as far and, for this particular type of fault, another arrangement will be provided. However, for all other faults, regardless of the number of conductors or independently of which conductors are involved in the fault, the relay will provide exactly the same distance response.

Referring now to Fig. 1 of the drawings, I have illustrated a particular embodiment of my invention as applied to a three-phase alternating-current system. As shown, the system comprises a three-phase bus 10 including the respective phase conductors 10A, 10B, and 10C connected through a suitable circuit-interrupting means, such as a latched closed circuit breaker 11, to a three-phase transmission line or circuit to be protected 12 including the corresponding phase conductors 12A, 12B, and 12C, respectively. Circuit breaker 11 is shown as provided with a trip coil 13 and an "a" auxiliary switch 14 which is closed when the circuit breaker is closed and open when the circuit breaker is open.

In order to isolate the polyphase circuit or transmission line 12 from the associated system, such as bus 10, upon the occurrence of a fault on the former, I have provided an electroresponsive device generally indicated at 15 and specifically illustrated as a polyphase ohm unit of the impedance type having a single movable element 16 for controlling switch member 17 adapted to bridge contacts 18 connected in the circuit of trip coil 13. The circuit of trip coil 13 preferably includes the contacts 19 adapted to be bridged by member 20, preferably controlled by a polyphase power-directional unit such as that disclosed and claimed in United States Letters Patent 2,110,673 referred to above so that tripping of circuit breaker 11 will not occur by virtue of the operation of electroresponsive device 15 unless the fault is on the protected section 12.

The structure of the electroresponsive device 15, which is only schematically illustrated, forms no part of my invention and may comprise any of the structures well known to those skilled in the art. Accordingly, it may comprise an induction-disk or induction-cup or induction-dynamometer construction or, as illustrated in Fig. 1, may comprise a balanced-beam type of relay including means such as solenoids 21 and 22 for applying an operating torque and a restraining torque respectively to movable member 16.

In accordance with Equation 1 above, it is necessary that solenoid 21 produces an operating torque which is applied to movable member 16 proportional to the sum of the magnitudes of the positive-phase-sequence and negative-phase-sequence currents flowing in the protected line section 12 without regard to the algebraic sign of these phase-sequence components. Accordingly, I have provided the well-known bridge type of phase-sequence filter generally indicated at 23 for simultaneously isolating the positive and negative-phase-sequence components of current in the absence of zero-phase-sequence currents. One arm of the bridge type of network or filter 23 includes the positive-phase-sequence output 24, another arm of the bridge includes the resistor 25, still another arm of the bridge includes the negative-phase-sequence current output 26, while the fourth arm of the bridge includes an impedance comprising the resistor 27 and inductance 28. It will be understood by those skilled in the art that the impedance of the positive-phase-sequence current output circuit 24 should be substantially equal to the impedance of the negative-phase-sequence current output circuit 26, while the ohmic value of resistor 25 should be equal to the ohmic value of the arm of the bridge including resistor 27 and inductance 28.

In order to energize the bridge type phase-sequence network 23 so as to isolate the positive and negative-phase-sequence components of current of transmission line 12, I provide a plurality of current transformers each associated with one of the phase conductors of line 12 and having secondary windings 29A, 29B, and 29C, respectively. Any suitable means for eliminating the zero-phase-sequence component of current may be provided. In Fig. 1, I have chosen to use phase currents and subtract therefrom the zero-phase-sequence component of current by in effect subtracting one third of the residual current. Accordingly, I provide transformers 30 and 31, respectively, having secondary windings 32 and 33, respectively, connected to energize network 23 with the appropriate quantities so that the positive and negative-phase-sequence components may be isolated therefrom. Transformer 30 is provided with primary windings $34_a$ and $34_b$, respectively, while transformer 31 is provided with primary windings $35_a$ and $35_b$, respectively. Winding $34_a$ is connected with secondary winding 29A of the current transformer associated with phase conductor 12A so that winding $34_a$ is energized with a current proportional to $I_A$, namely, the current flowing in phase A of the protected line section 12. Similarly, primary winding $35_a$ is energized with the phase current $I_B$. The windings $34_b$ and $35_b$, on the other hand, are energized with the residual current flowing in the protected section 12, and, to accomplish this, I have provided a suitable impedance 36 connected in series with the secondary winding 29C which acts as a dummy load and provides the same impedance as windings $34_a$ and $35_a$, respectively. Since the residual windings $34_b$ and $35_b$ are illustrated as having one third as many turns as the windings $34_a$ and $35_a$, respectively, and the windings are so arranged that the residual current produces a flux in opposition to the flux produced by windings $34_a$ and $35_a$, it will be observed that, in effect, secondary winding 32 is energized with a current proportional to the phase current $I_A$ minus the zero-phase-sequence current $I_0$ and, similarly, secondary winding 33 of transformer 31 is energized with the phase current $I_B$ minus the zero-phase-sequence current $I_0$.

In order that the positive and negative-phase-sequence components of current flowing in protected line section 12 may be added together without regard to phase position, the positive-phase-sequence output 24 of bridge type network 23 is connected to a full-wave rectifier 37 while the negative-phase-sequence output 26 is connected to a full-wave rectifier 38 and the direct-current outputs of these rectifiers are connected in series with one another and with the winding 39 of solenoid 21 so as to energize solenoid 21 in response to the sum of the magnitudes without regard to sign of the positive and negative-phase-sequence components of current.

In order to produce a restraining torque on movable member 16 proportional to the difference between the magnitudes of the positive-phase-sequence component of voltage and the negative-phase-sequence component of voltage at the relay, I provide networks 40 and 41, respectively, for isolating the positive and negative-phase-sequence components of voltage of the protected section at the relay. An open-delta potential transformer 42 having primary windings 43 and secondary windings 44 is provided so that the networks 40 and 41 may be energized with line-to-line voltages in a well-known manner. As is well understood by those skilled in the art, the voltage networks 40 and 41 each comprise a plurality of inductances 45, a capacitor 46, and resistors 47 and 48, respectively. The inductances 45 of network 40 are arranged to form the primary windings of a transformer 49 having a secondary winding 51, the output of which is proportional to the positive-phase-sequence voltage of transmission line 12 at the relay. Similarly, inductances 45 of filter 41 form the primary winding of a transformer 50 having a secondary winding 51, the output of which is proportional to the negative-phase-sequence component of voltage. In order to obtain the difference between the outputs of secondary windings 49 and 51 without regard to the phase relationship between the two, I provide full-wave rectifiers 52 and 53, respectively, having the direct-current outputs thereof connected across resistors 54 and 55, respectively, which are connected in opposition so that the potential across the resistors is proportional to the difference between the positive-phase-sequence component of voltage and the negative-phase-sequence component of voltage. Resistors 54 and 55 are serially arranged and connected across the winding 56 of solenoid 22. It will be observed, therefore, that electroresponsive device 15 having a single movable element 16 has applied thereto an operating torque proportional to the sum of the magnitudes without regard to the phase relationship of the positive-phase-sequence and the negative-phase-sequence currents of the circuit existing at the relay and a restraining torque proportional to the difference between the magnitudes of the positive-phase-sequence potential and the negative-phase-sequence potential independently of the phase relationship of such potentials so that, as set forth above, electroresponsive device 15 will provide the same distance response for any type of fault occurring on transmission line 12 involving more than one conductor.

The operation of the protective system disclosed in Fig. 1 will be obvious to those skilled in the art in view of the detailed description included above.

In Fig. 2, I have illustrated a modification of my invention in which the corresponding parts of Fig. 1 are designated by the same reference numerals. A somewhat different arrangement for eliminating the zero-phase-sequence current from bridge type network 23 from that disclosed in Fig. 1 is provided. The secondary windings 29A, 29B, and 29C of the current transformers associated with line 12 are so arranged with respect to the primary windings 34 and 35 of transformers 30 and 31, respectively, that the secondary winding 32 is energized with a current proportional to $I_A - I_C$ and the secondary winding 33 is energized with a current proportional to $I_A - I_B$. It will be obvious to those skilled in the art that, by this arrangement, the zero-phase-sequence components of current are eliminated from the bridge type phase-sequence network 23 so that the output 24 is again proportional to the positive-phase-sequence component of current and the output 26 is proportional to the negative-phase-sequence component of current. Instead of rectifying the positive and negative-phase-sequence outputs, however, as in Fig. 1, these outputs are connected directly to the windings 57 and 58 of solenoids 59 and 60, respectively, which are associated with movable member 16 so as each to produce an operating torque proportional to the first power of the energizing current whereby the resultant operating torque on movable member 16 is proportional to $I_1' + I_2'$. The directions of the forces applied to member 16 by solenoids 58 and 59 are designated in the drawing by suitable arrows adjacent thereto.

Instead of rectifying the positive and negative-phase-sequence components of voltage as in Fig. 1, the inductances 45 of filter 40 provide the energizing winding of a suitable solenoid 61 and the inductances 45 of network 41 provide the energizing windings for solenoid 62 connected so as to oppose one another and provide a restraining torque for movable member 16. The directions of the forces applied to movable member 16 by solenoids 61 and 62 when energized are designated in Fig. 2 by appropriate arrows adjacent thereto. Solenoids 58, 59, 61, and 62 must, of course, be designed so as to produce a torque proportional to the first power of the energizing current or any other means for accomplishing this result may be provided. It will be understood by those skilled in the art that the solenoids 59, 60, 61, and 62 will provide a sort of rectifier action in the sense that the alternating current energizing the windings thereof will cause a torque in the same direction during each half cycle thereof. Furthermore, it will be obvious to those skilled in the art that the arrangement disclosed in Fig. 2 will operate in the same manner as that disclosed in Fig. 1.

With the arrangements described in Figs. 1 and 2 above, it will be observed that a polyphase distance relay of the impedance type having the same reach for all faults involving more than one conductor is provided. In order to provide protection for single line-to-ground faults, I have illustrated in Fig. 3 a protective system somewhat similar to that disclosed in Fig. 1 for taking care of single line-to-ground faults on protected line section 12 and the corresponding parts thereof are designated by the same numerals as in Figs. 1 and 2. I have discovered that, if an impedance relay having a single movable element has applied thereto an operating torque proportional to the zero-phase-sequence component of current and a restraining torque proportional to $$V_{1'} - V_{2'} - V_{0'}$$

there will be obtained a distance response which is substantially proportional to the positive-phase-sequence impedance between the relay and the fault similar to the distance response of the electroresponsive device 15 of Figs. 1 and 2. In other words, the ratio $$\frac{V_1' - V_2' - V_0'}{I_0'} = KZ_1' \qquad (2)$$

where K is a constant, is substantially proportional to the positive-phase-sequence impedance $Z_1'$ between the relay and the fault. This can be shown by substituting the values of the phase-sequence components from Table I in Equation 2 whereupon the following relationship is obtained:

$$\frac{V_1' - V_2' - V_0'}{I_0'} = Z_1'\left(2\frac{C_1}{C_0} + \frac{Z_0'}{Z_1'}\right) \quad (3)$$

For an average transmission line, it may be assumed that $C_1$ is equal to $C_0$ and the ratio $$\frac{Z_0'}{Z_1'} = 3$$

so that the constant K in the above equation has a value of about 5. The ratio of $$\frac{Z_0'}{Z_1'}$$

will not change but the ratio $$\frac{C_1}{C_0}$$

may vary with system switching. In extreme cases, therefore, there may be sequential tripping of the relays at the two ends of the line because there may be very little residual current at one end of the line (making $C_0$ small) until the breaker at the other end has opened. In such cases, however, the ground relays known heretofore would have the same defects.

Referring now to Fig. 3, I have illustrated an electroresponsive device 63 comprising a single movable element 16 with an operating solenoid 64 associated with one end thereof and a restraining solenoid 65 associated with the other end. The winding 66 of operating solenoid 64 is connected with the current transformers having secondary windings 29A, 29B, and 29C so as to be energized with residual current flowing in line section 12 which is three times the value of the zero-phase-sequence component. As in Fig. 1, a potential proportional to the difference between the positive-phase-sequence component of voltage and the negative-phase-sequence component of voltage is obtained across serially connected resistors 54 and 55. In order to obtain a voltage proportional to the zero-phase-sequence component, potential transformer 42, illustrated as having a Y-connected primary winding 43' associated with bus 10 and a Y-connected secondary winding 44', is also provided with an open-delta tertiary winding 67. The zero-phase-sequence potential obtained across the terminals of the open-delta winding 67 is rectified by means of a full-wave rectifier 68. A suitable trap 69 for eliminating the higher harmonics may be provided. The direct-current output of rectifier 68 appears across a resistor 70 which is connected in series with resistors 54 and 55 and is so proportioned with respect thereto that a potential is obtained across serially connected resistors 54, 55, and 70 which is proportional to $V_1' - V_2' - V_0'$. This potential is impressed across the winding 71 of restraining solenoid 65. These windings will be so proportioned for a particular system that the distance response of electroresponsive device 63 for a single line-to-ground fault will be equal to $Z_1'$, the same response as the distance relays of Figs. 1 and 2 provide for all faults except single line-to-ground faults.

The operation of the polyphase electroresponsive device 63 of Fig. 3 for protecting against single line-to-ground faults will be obvious to those skilled in the art from the detailed description included above. It will, of course, be obvious to modify the arrangement of Fig. 3 along the lines of Fig. 2 so as to eliminate the requirement of rectifiers for the positive, negative, and zero-phase-sequence potentials.

While I have described what I at present consider the preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a distance-responsive device for protecting a polyphase alternating-current circuit, a single movable member for operating a control circuit, means for exerting a torque on said member substantially proportional to the sum of the magnitudes of the positive and negative-phase-sequence components of current of said circuit and an opposing torque substantially proportional to the difference between the magnitudes of the positive and negative-phase-sequence components, respectively, of the voltage of said circuit.

2. In combination with an alternating-current electric circuit, circuit-interrupting means for controlling said circuit, an electroresponsive device having a single movable element for controlling said circuit-interrupting means, and means for energizing said electroresponsive device from said circuit so that an operating torque proportional to $I_1' + I_2'$ and a restraining torque proportional to $V_1' - V_2'$ are applied to said single movable element, where $V_1'$ and $V_2'$ are the magnitudes of the positive and negative-phase-sequence components of voltage of said circuit and $I_1'$ and $I_2'$ are the magnitudes of the positive and negative-phase-sequence components of current of said circuit.

3. In an electroresponsive device for an electric circuit, a single movable member including a plurality of torque-producing means associated therewith, and means for exerting a resultant torque on said member in response to a fault on said electric circuit which is substantially proportional to the difference between the sum of the magnitudes of the positive and negative-phase-sequence currents of said circuit and the difference between the magnitudes of the positive and negative-phase-sequence voltages of said circuit.

4. In a distance-responsive device for protecting a polyphase alternating-current circuit, a single movable member for operating a control circuit, means for exerting on said member an operating torque dependent on the zero phase-sequence component of current of said circuit, and means for exerting a restraining torque on said member dependent to at least some extent on the difference between the magnitudes of the positive and negative-phase-sequence components of voltage of said circuit.

5. In combination with an alternating-current electric circuit, circuit-interrupting means for controlling said circuit, an electroresponsive device having a single movable element for controlling said circuit-interrupting means, and means for energizing said electroresponsive device from said circuit so that an operating torque proportional to $I_0'$ and a restraining torque proportional to $V_1' - V_2' - V_0'$ are applied to said single movable element, where $I_0'$ is the magnitude of the zero-phase-sequence component of current flowing in said alternating-current circuit and $V_1'$, $V_2'$, $V_0'$ are the magnitudes of the positive, negative, and zero-phase-sequence components of voltage of said circuit.

6. In a distance-responsive device for protecting a polyphase alternating-current circuit, a single movable member for operating a control circuit whenever a single line-to-ground fault occurs on said polyphase circuit independently of the particular conductor involved in said fault, means for exerting an operating torque on said member substantially proportional to the zero-phase-sequence current flowing in said alternating-current circuit, and means for exerting a restraining torque on said member in response to a predetermined function of the phase-sequence components of voltage of said alternating-current circuit.

7. In combination with a polyphase alternating-current electric circuit, circuit-interrupting means for controlling said circuit, a polyphase electroresponsive device of the distance type having a single movable element for controlling said circuit-interrupting means, a plurality of torque-producing members associated with said element including current and potential windings, means for isolating the positive and negative-phase-sequence components of current and potential of said alternating-current circuit, rectifier means for each of said quantities, means for energizing said current winding with the sum of the rectified positive and negative-phase-sequence components of current, and means for energizing said potential winding with the difference between the rectified positive and negative-phase-sequence components of voltage so that said polyphase electro-responsive device has the same distance response for all faults which might occur on said polyphase alternating-current circuit involving more than one conductor.

8. In combination with a polyphase alternating current circuit, circuit interrupting means for controlling said circuit, a polyphase electro-responsive device of the distance type having a single movable element for controlling said circuit interrupting means, a plurality of torque producing members associated with said element including a current and a potential winding, means for isolating the positive, negative and zero-phase-sequence components of voltage of said alternating-current circuit, rectifier means for each of said components each connected with one of said last mentioned means, means for energizing said current winding with the zero-phase-sequence current flowing in said alternating-current circuit, and means for energizing said potential winding with the difference between the rectified positive-phase-sequence component of the voltage and the sum of the rectified negative and zero-phase-sequence components of voltage of said circuit so that said polyphase electroresponsive device has the same distance response for all ground faults which might occur on said polyphase alternating-current circuit involving only one conductor.

ALBERT R. van C. WARRINGTON.